(12) United States Patent
Mercier et al.

(10) Patent No.: US 6,500,395 B1
(45) Date of Patent: Dec. 31, 2002

(54) METHOD FOR REMOVING METALS FROM AIR POLLUTION CONTROL RESIDUES

(75) Inventors: Guy Mercier, Quebec (CA); Myriam Chartier, Quebec (CA); Guy Roberge, Ancienne-Lorette (CA); Christine Sauvageau, Cap Rouge (CA)

(73) Assignee: Institut National de la Recherche Scientifique, Quebec (CA)

( * ) Notice: Subject to any disclaimer, the term of this patent is extended or adjusted under 35 U.S.C. 154(b) by 0 days.

(21) Appl. No.: 09/666,939

(22) Filed: Sep. 21, 2000

(30) Foreign Application Priority Data

Sep. 21, 1999 (CA) .............................................. 2282884

(51) Int. Cl.$^7$ ................................................. C22B 7/00
(52) U.S. Cl. ............................. 423/1; 423/98; 423/109; 423/27; 423/87; 423/49
(58) Field of Search ............................ 423/98, 109, 87, 423/27, 42, 49, 50, 1, 658.5, 92, 101; 205/560, 562, 563, 580, 589, 599, 604; 75/724, 725, 726

(56) References Cited

U.S. PATENT DOCUMENTS

| | | | |
|---|---|---|---|
| 4,524,049 A | | 6/1985 | Sit ............................... 423/65 |
| 4,606,765 A | * | 8/1986 | Ferlay |
| 4,649,011 A | | 3/1987 | Umeha et al. ............... 264/267 |
| 4,891,067 A | * | 1/1990 | Rappas et al. |
| 5,037,479 A | * | 8/1991 | Stanforth |
| 5,234,669 A | * | 8/1993 | Barlett |
| 5,282,938 A | * | 2/1994 | Legiec et al. |
| 5,453,111 A | | 9/1995 | Myerson et al. ............... 75/725 |
| 5,512,257 A | | 4/1996 | Frey ............................ 423/98 |

FOREIGN PATENT DOCUMENTS

| | | |
|---|---|---|
| CA | 1242567 | 10/1988 |
| CA | 2053443 | 4/1992 |
| JP | 10-5736 | * 1/1998 |
| JP | 11-335748 | * 12/1999 |
| WO | WO 97/44500 | 11/1997 |

OTHER PUBLICATIONS

"Environmental Assessment of Ash Disposal", Theis et al., CRC Reviews In Environmental Control, vol. 20, pp. 21–42, 1990, No month.

* cited by examiner

*Primary Examiner*—Steven Bos
(74) *Attorney, Agent, or Firm*—Perman & Green, LLP

(57) ABSTRACT

A method for the treatment of air pollution control (APC) residues comprising the steps of washing the residues at least one time in an alkaline solution maintained at a pH not lower than about 11.5, separating the alkaline washed residues from the alkaline solution. The present method further comprises an optional step of verifying whether the alkaline washed residues are substantially devoid of metal components. When the alkaline washed residues are not substantially devoid of metal components, the alkaline washed residues are washed at least one time in an acid solution maintained at a pH between about 2 and about 4.5 and the acid washed residues are separated from the acid solution so as to produce residues substantially devoid of metal components. The APC residues obtained in application of the methods according to the present invention constitute non-hazardous material/waste.

35 Claims, 1 Drawing Sheet

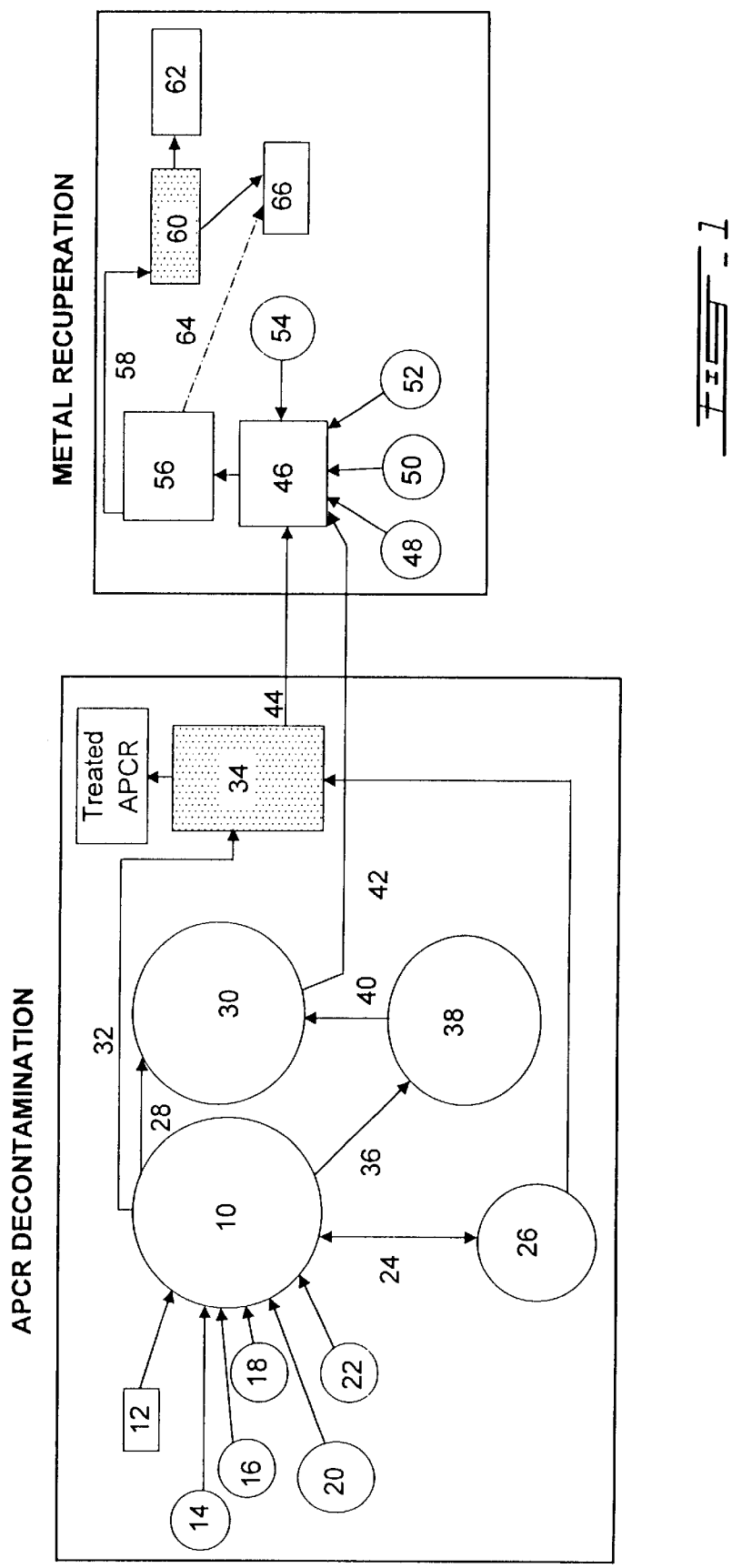

METHOD FOR REMOVING METALS FROM AIR POLLUTION CONTROL RESIDUES

FIELD OF THE INVENTION

The present invention relates to a method for removing metals from air pollution control residues. More specifically, the present invention is concerned with a method for removing metals such as lead, cadmium and mercury from air pollution control residues.

BACKGROUND OF THE INVENTION

The growing production of domestic and industrial wastes in industrialised countries causes serious disposal problems. A largely used technique for managing these wastes is incineration. Incineration produces ashes and hot gases. The hot gases generally contain volatilised metals and metals adsorbed on particles. These toxic metal components are produced during the combustion of wastes containing inert forms of these metals. Most incinerators contain air pollution control (APC) devices meant to treat hot gases and limit environment contamination.

Municipal solid waste incinerators (MSWI), for instance, may comprise three types of APC devices operating in sequence. The hot gases are first directed to boiler tubes wherein a portion of the metals contained in these gases precipitate and become adsorbed on fly ashes particles to produce boiler fly ashes. The residual gas stream travels through an electrostatic precipitator which traps a further portion of the remaining metal contaminants and forms electrostatic precipitator fly ashes. Finally, what remains of the gas stream travels through an injection of dry or semi-dry lime which retains acids and metals. Each of these devices thereby produces high metal content APC residues, namely and respectively boiler fly ashes, electrostatic precipitator fly ashes and used lime.

Thus, MSWI produce two main types of residues: bottom ashes and APC residues. The bottom ashes constitute between 20 and 35% of the initial waste mass and generally does not have a high content in toxic metals. They are generally therefore not considered hazardous. The APC residues constitute 2 to 3,5% of the initial waste mass and constitute hazardous wastes.

Various attempts have been made to treat APC residues in order to convert them into non-hazardous material. Attempts have been made to adapt techniques used for treating coal APC residues to MSWI APC residues. Coal APC residues are commonly mixed with coal combustion bottom ashes and used as fill material in building products such as brick, cement or road fill. These techniques however are not adequate for MSWI APC residues which contain much higher concentrations of toxic substances, namely heavy metals. See, Theis and Gardner in Environmental Assessment of ash disposal, CRC Reviews in Environmental control, vol. 20 p 21–42, 1990. One of the techniques currently used for MSWI APC residues is the stabilisation of APC residues in cement prior to landfill. Such method has the disadvantage of increasing the volume of APC residues to be landfilled and consequently entailing high costs.

Various techniques comprising the recuperation of valuable elements in the residues and their resale have also been proposed in attempts to reduce their net management costs. Attempts have been made to extract phosphate and metals from sewage sludges incinerators derived bottom and fly ashes. The principal value so extracted was the phosphate. Sewage sludges have a high phosphate content which justifies the costs of this technique. It may not be cost effective for the decontamination of APC residues derived from sources that have lower phosphate contents. For instance, MSWI APC residues contain 5 to 20 times less phosphate.

Others have proposed the extraction of iron and aluminium from fly ash generated during coal combustion methods to produce electricity. The iron and aluminium salts so extracted could be used in wastewater treatment. The extraction was conducted in two steps 1) NaOH (15%) at 90° C. and 2) HCl (15%) at 90° C. It may not be cost effective for the decontamination of APC residues derived from sources that have lower iron and aluminium content. For instance, MSWI APC residues contain amounts of iron and aluminium that would not justify the use of this technique. Furthermore, the APC residues and salts produced by this method still contain excessive amounts of toxic metals. For this reason, the salts are of low quality and the residues could not be directly landfilled.

A technique involving the extraction of metals from APC residues comprising mixing 5% of APC residues with HCl at pH 3 and NaCl 1 M was also proposed. This method is costly due to its high HCl consumption. Its efficiency is also limited because of the difficulties involved in the technique used for extracting the metals: selective plating of lead, zinc, cadmium, nickel or copper is hindered by the high iron concentration in solution.

Similarly, U.S. Pat. No. 4,649,011 involves the extraction of metals which have a high market value (vanadium, chromium, molybdenum, actinides and lanthanides) from combustion wastes from the coal industry. The method describes involves the addition of sodium and potassium carbonate to the combustion waste and heating the mixture at 60° C. The combustion wastes are then treated in an acid solution having a pH of between 0 and 1. This method involves the use of a large quantity of alkaline and acid chemicals so that it is not cost effective for treating APC residues that do not contain these rare metals.

Vitrification of APC residues has also been proposed. This method requires that the bottom ashes be mixed with the APC residues so that it has the disadvantage of increasing the volume of wastes to dispose and consequently increasing the costs. Moreover the hot gas generated during the method is difficult to treat.

Other methods suggested use acid leaching techniques to dissolve metals contained in APC residues. U.S. Pat. No. 5,512,257 and Canadian Patent Application No. 2,053,443 by Frey, describe a method that uses the acidic water generated in a wet scrubber to extract metals. The wet scrubber is an APC device wherein the hot gas is put in contact with water thereby increasing its acid content. Wet scrubbers are not common APC devices. The efficiency of this method remains to be established. The fact that treated residues are returned in the combustion chamber for further stabilisation seems to indicate that they could not be directly disposed of and that their metal content remains excessive after the method. Canadian Patent No. 1,242,567 by Vogg, also describes an acid leaching of the APC residues in wet scrubber acid streams.

U.S. Pat. No. 4,524,049 describes a method that comprises an acid extraction technique at high temperature and pressure to recover nickel and vanadium from fluid coke or fly ash derived from the burning of fluid coke.

U.S. Pat. No. 5,453,111 describes a method to recover iron, zinc, cadmium and lead from electric arc furnace dust. The dust is first roasted and then treated with an ammonium chloride solution at high temperature (90° C.).

International Application No. WO09744500 describes a method by which APC residues are mixed with water to produce a solution having a pH higher than 11.8. This pH is reached without the addition of any alkaline chemical. Alkaline washes of APC residues are generally not sufficient to substantially remove the toxic metals that they contain.

These methods suffer from important drawbacks. Some of them require large quantities of expensive chemicals such as acids or oxidizers or involve extreme conditions requiring costly equipments. Others involve high costs because of the large volume of treated residues produced that needs to be landfilled. Hence, the methods requiring that bottom ashes be mixed with APC residues constitute expensive methods. Finally some of the methods described do not appear to efficiently remove toxic metals or diminish the leaching potential of the APC residues.

SUMMARY OF THE INVENTION

The present invention provides a method for the treatment of air pollution control (APC) residues comprising the steps of a) washing the residues at least one time in an alkaline solution maintained at a pH not lower than about 11.5; b) separating the alkaline washed residues from the alkaline solution produced in step a); c) verifying whether the alkaline washed residues obtained in step b) are substantially devoid of metal components. When the alkaline washed residues obtained in step b) are not substantially devoid of metal components, the alkaline washed residues are washed at least one time in an acid solution maintained at a pH between about 2 and about 4.5 and the acid washed residues are separated from the acid solution so as to produce residues substantially devoid of metal components and d) recover these residues.

The present invention provides an alternative method for the treatment of air pollution control (APC) residues comprising the steps of a) washing the residues at least 1 to 6 times in an alkaline solution maintained at a pH of not lower than 11.5 for a period of between about 30 seconds to about 30 minutes for each wash; b) separating the alkaline washed residues from the alkaline solution produced in step a); c) verifying whether the alkaline washed residues obtained in step b) are substantially devoid of metal components. When the alkaline washed residues obtained in step b) are not substantially devoid of metal components, the alkaline washed residues are washed at least 3 to 7 times in an acid solution maintained at a pH between about 2 and about 4.5 so as to produce residues substantially devoid of metal components and d) recover those residues.

The present invention provides an alternative method for the treatment of air pollution control (APC) residues comprising the steps of a) washing the residues at least one time in an alkaline solution maintained at a pH of not lower than about 11.5 for a period of between about 30 seconds to about 30 minutes for each wash; b) separating the alkaline washed residues from the washing solution produced in step a); c) washing the alkaline washed residues from step b) at least 3 times in an acid solution maintained at a pH between about 2 and about 4.5; d) separating the acid washed residues from the washing solution produced in step c) so as to obtain residues substantially devoid of metal components; e) recover these residues and wherein metals may be recuperated from the washing solution produced in steps b) and d).

The alkaline and acidic washing steps can be conducted in different reactors or alternatively in the same reactor operated as a sequential batch reactor.

The method of the present invention can be used to treat APC residues originating from various combustion facilities such as municipal solid waste incinerators (MSWI), hazardous waste incinerators, sewage sludges incinerators, coal burning incinerators, medical waste incinerators or metallurgical plants. The method of the present invention is also useful for treating APC residues which have undergone a pre-treatment such as the removal of organic contaminants.

In other specific embodiments of the present invention, the method described herein could be applied to a specific granulometric fraction of the APC residues.

The methods according to the present invention encompass the use of various techniques to concentrate the metals present in the liquid. For instance, the techniques of electrowinning, electroplating, cementation, adsorption of metals on various matrix, etc . . . are appropriate techniques that could be used within the method of the present invention.

The number of washes applied according to the present invention is dependent of the nature and concentration of the metal contaminants.

The method according to the present invention could be performed in a permanent or a temporary plant. It could also be used on a mobile unit installed on water or on land.

Additional steps can be added to the method according to the present invention without departing from its spirit and nature. For instance, after the acid washes the APC residues and/or metal concentrates can be subjected to other treatments to better prepare them for the purpose for which they are intended. For instance, the APC residues may be intended for uses in as construction material (concrete, brick, road fill), in sanitary landfill (as daily covering material), etc.

As provided herein the expression "air pollution control residues" (APC residues) is meant to include boiler fly ashes, electrostatic precipitator fly ashes, used lime or a mixture thereof.

As provided herein, the expression "substantially devoid of metal components" means that the level of metal contained is sufficiently low to constitute non-hazardous waste or material. In particular, according to the year 2000 United States norms, residues that leach less than 5 mg/L of lead, less than 1 mg/L of cadmium and less than 0.2 mg/L of mercury during TCLP tests are considered to be substantially devoid of metal components.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawing:

FIG. 1 is a schematised view of the steps of a specific embodiment of the present invention.

DESCRIPTION OF THE PREFERRED EMBODIMENT

The method of the present invention comprises a first step of washing APC residues in at least one alkaline solution to dissolve a substantial portion of the toxic metals that they may contain. The method then comprises a verification step meant to determine whether the APC residues are substantially devoid of metals. If they are not, the method of the present invention comprises a subsequent step of washing the APC residues in at least one acid solution to dissolve the remaining metals so as to obtain APC residues substantially devoid of metals.

While this invention may be applied to any APC residues, the preferred embodiment described herein is particularly applicable to MSWI APC residues.

As shown in FIG. 1, a specific method according to the present invention may be divided into two main parts: 1) APC residues decontamination; and 2) metal recuperation.

APCR Decontamination

In the APCR decontamination part and as shown in FIG. 1, the APC residues 12 are introduced into the main reactor 10 along with water 18 and, if necessary, a strong base 14 so as to maintain a pH of at least 11,5. APC residues are mixed in this solution for an appropriate time. The total solid content can be adjusted to reach between 30 and 400 g/L (3%–40%) for optimum results depending on the nature of the APC residues.

When the APC residues originate from municipal solid waste incinerators (MSWI), between about 1 to 6 alkaline washes can be performed for optimum results. After each alkaline wash, the washed APC residues are decanted and the supernatant alkaline solution is removed and sent 36 to the alkaline wash storage 38. A flocculating agent 16, such as a polymer, may be added at the end of each wash to enhance settling of the APC residues. For each new wash, the main reactor 10 containing the washed APC residues is filled with fresh water 18 and, if necessary, a strong base 14.

When APC residues are MSWI derived, the alkaline washes optimally last between about 30 seconds to 30 minutes and preferably 2 minutes. The mixing is vigorous so that the alkaline washes may dissolve a substantial part of the lead, zinc, arsenic, copper, mercury, manganese or other metals present in the APC residues.

After the last wash and the last solid/liquid separation, the alkaline washed APC residues are sent 24 into a storage tank 26 for Toxicity Characteristics Leaching procedure (TCLP) tests. The TCLP tests will determine whether these residues contain less than the acceptable limits of lead, cadmium and mercury according to the governing legislation. For instance, in the United States in the year 2000, APC residues leaching less than 5 mg/L of lead, less than 1 mg/L of cadmium and less than 0.20 mg/L of mercury in appropriate TCLP tests were considered acceptable to be disposed of without constituting hazardous material. In the province of Quebec, Canada, the current (2000) limits for these metals are 5 mg lead/L, 0.5 mg cadmium/L and 0.1 mg Hg/L.

If they contain less than the acceptable levels of these metals, the APC residues may be sent to a dewatering step. During the dewatering step, the residues may be submitted to conditioning agents (not shown) such as polymers and sent to a filtration device 34 such as filter-press or any other device able to separate solids from liquids. The residues so treated can be neutralised by the addition of the appropriate compound (acid or base) (not shown) and disposed of or recycled.

If the testing reveal that the alkaline washed ACP residues are not substantially devoid of metals, they are sent back 24 to the main reactor 10 to be subjected to at least one acidic wash. Water 18 and a strong acid 20 such as sulphuric, nitric, hydrochloric or used acid are added to the residues to produce an acid solution having a pH of between 2 and 4.5. The total solid content can be adjusted to reach between 30 and 400 g/L (3%–40%) for optimum results depending on the nature of the APC residues. Furthermore, 0.02 to 0.2 g of an oxidizer 22 such as $FeCl_3$ (11% Fe) per g of APC residues can also be added during certain acid washes to obtain a redox potential between 100 and 400 mV. Other strong oxidizers such as hydrogen peroxide may be used. The washes may last between 30 minutes and 24 hours. A flocculating agent 16, such as a polymer, may be added at the end of each wash to enhance settling of the APC residues. Settling may last 5 to 120 minutes depending on the nature of the residues.

When the APC residues are MSWI derived, and although fewer washes could be sufficient depending on the contamination of the residues, preferably about 3 to about 7 acid washes are performed for optimal results so that a substantial portion of the cadmium, zinc, copper, manganese and mercury that the APC residues still contain is dissolved. An oxidizer is preferably added to the solutions during the second and third acid washes with respective concentrations between 0.1 and 0.2 g per g of APC residues during the second wash and between 0.02 to 0.08 g per g of APC residues during the third wash. The pH is preferably adjusted between 3 and 4.5 during the second wash.

If they are required, the APC residues can then be subjected to four other washes without the addition of any oxidizer at a pH maintained between 2 to 4.5.

After each acid wash, the APC residues are decanted between 5 and 120 minutes depending on the nature of the supernatant. Any technique or equipment able to extract liquid from the slurry constituted of the APC residues may be used to perform the solid/liquid separation. Coagulation or flocculation agents may be added (not shown) to the solution to facilitate this separation. The supernatant is then sent 28 to the acid supernatant storage tank 30.

After the last acid wash, the APC residues may be sent to a dewatering step. During the dewatering step, the residues may be submitted to conditioning agents (not shown) such as polymers and sent to a filtration device 34 such as filter-press or any other adequate dewatering apparatus. The residues so dewatered can be neutralised with the addition of an alkaline material (not shown) such as lime, calcite or any equivalent material and landfilled or recycled.

The temperature is preferably maintained between 10 and 50° C. during the washes.

The acid supernatant 30 and the alkaline supernatant 38 are mixed together. This can be done for instance as shown in FIG. 1, by sending the alkaline supernatant 38 to 40 the acid supernatant storage tank 30. The resulting liquid can than be treated for metal recuperation.

Metal Recuperation

The mixed liquids are sent 42 to a conditioning tank 46 that also receives the filtrate 44 from the dehydration of the treated APC residues. Acids 48 or bases 52 (e.g.: lime) can be added to the mixed liquids to adjust its pH and facilitate precipitation of the metals in the settling tank 56. Polymers 50 can then be added to the liquids to facilitate settling in the settling tank 56. The precipitation can also be conducted in two steps. A first precipitation is then conducted at a pH of 3.5 to remove ferric hydroxide and a second precipitation is conducted at a pH between 7 and 9 to precipitate toxic metals concentrate. The precipitation can be done in a batch or in a continuous mode of operation.

The supernatant produced during the precipitation step can be sent 64 to a septic tank 66 or be returned upstream in the method as wash water because it is substantially free of metals. It indeed contains a maximum of 2 mg Pb/L and Cd/L. In average, it contains 0.32 mg Pb/L and 0.35 mg Cd/L.

The metal concentrate 58 is sent to a dewatering device such as a filter-press 60 or other dewatering device to produce a filtrate which can also be sent to the septic tank 66 and a metal concentrate 62 that can be recycled to recover metals of value. It can alternatively be disposed of as a hazardous material because of its relatively small volume. The cake of metal concentrate can be dried in free air or in a drier.

EXAMPLE NO 1

APC residues containing boiler ashes (25.9%), electrostatic precipitator ashes (45.1%) and used lime (28.6%) produced in municipal solid waste incinerators (MSWI) were mixed together and introduced into a main reactor. They were then subjected to five successive alkaline washes lasting about 2 minutes each wherein 200 g/L of APC residues were mixed in water and a strong base to create a solution with a pH higher than 11.5. After these washes, the alkaline washed APC residues were sent to a storage tank where they were tested to determine whether they were substantially devoid of metal components. This verification revealed that they weren't. The APC residues were therefore sent back to the main reactor where they were subjected to seven successive acidic washes of approximately 30 minutes each. In each wash, about 50 g/L (5%) of APC residues from the previous wash were mixed with water and sulphuric acid so as to obtain a pH of 3.5. During the second wash, 0.158 g of a ferric chloride solution (11% Fe) per gramme of APC residues was added to the mixture. The ferric chloride, an oxidizer, was added to achieve a redox potential of between 100 and 400 mV. During the third wash, 0.0395 g of a ferric chloride solution (11% Fe) per gramme of APC residues was added to the mixture. Table 1 below presents the results of applying the above-described specific method according to the present invention. It presents the metal removal efficiency of this method for various metals and the TCLP leachates.

29.2%. It must be noted that the margin of error on analyses and sampling is approximately 10%. Because of this error margin, it is possible to have a small negative removal efficiency.

EXAMPLE NO 2

Table 2 below presents the results of applying the specific method according to the present invention presented in example 1 above to APC residues containing 41% of boiler ashes, 20% of electrostatic precipitator ashes and 39% of used lime.

TABLE 1

TREATMENT OF APC RESIDUES CONTAINING 26.2% OF BOILER ASHES, 45.2% OF ELECTROSTATIC PRECIPITATOR ASHES AND 28.6 USED LIME ACCORDING TO A SPECIFIC EMBODIMENT OF THE PRESENT INVENTION

|  | Pb | Cd | Cr | Cu | Fe | Ni | Zn | Hg | As | Se |
| --- | --- | --- | --- | --- | --- | --- | --- | --- | --- | --- |
| Conc. before (mg/kg) | 3179 | 305 | 428 | 833 | 20600 | 78.0 | 19900 | 13.9 | 277 | 7.4 |
| Conc. after (mg/kg) | 2875 | 43.4 | 1037 | 633 | 30100 | 91.8 | 8414 | 19.9 | 281 | 5.8 |
| Removal (%)* | 29.2 | 92.0 | 0.0 | 58.5 | 0.0 | 33.6 | 80.1 | 0.0 | 20.7 | 38.8 |
| TCLP before (mg/L) | 0.45 | 6.08 | 0.00 | 0.05 | 0.00 | 0.04 | 68.40 | NM | NM | NM |
| TCLP after (mg/L) | 4.03 | 0.25 | 0.00 | 4.55 | 0.39 | 0.04 | 3.36 | NM | NM | NM |
| Limit in | 5.00/ | 0.5/ | 5.00/ |  |  |  |  | 0.10/ | 5.0/ | 1.0/ |
| Quebec/USA | 5.00 | 1.00 | 5.00 |  |  |  |  | 0.20 | 5.0 | 1.0 |

*Since a significant proportion of the APC residues is dissolved in water during the washes, the removal efficiency may not be calculated by simply comparing concentrations but requires that the mass of dissolved APC residues be considered. In this example, 21.7% of the APC residues was dissolved.
NM: not measured
Conc.: concentration A significant proportion of the APC residues is dissolved in the aqueous solutions during the method. In example 1, 21.7% of the mass of APC residues is so dissolved. The removal efficiency can therefore not be calculated simply by comparing concentrations before and after but may be calculated by mass balance. In example 1, the treatment of 1 kg of raw APC residues produces 0.783 kg treated APC residues. The raw kilogram of APC residues contained 3179 mg Pb/kg. The treated 0.783 kg of APC residues contains 2875 mg Pb/kg so the mass of Pb is 0.783*2875=2251 mg of Pb. The removal is then ((3179−2251)/3179)*100=

TABLE 2

TREATMENT OF APC RESIDUES CONTAINING 41% OF BOILER ASHES, 20% OF ELECTROSTATIC PRECIPITATOR ASHES AND 39% OF USED LIME ACCORDING TO A SPECIFIC EMBODIMENT OF THE PRESENT INVENTION

|  | Pb | Cd | Cr | Cu | Fe | Ni | Zn | Hg | As | Se |
| --- | --- | --- | --- | --- | --- | --- | --- | --- | --- | --- |
| Conc. before (mg/kg) | 1825 | 168 | 409 | 549 | 14900 | 64.5 | 11000 | 27.2 | NM | NM |
| Conc. after (mg/kg) | 2512 | 43.7 | 456 | 509 | 14900 | 90.5 | 13400 | 33.7 | NM | NM |
| Removal (%)* | −2.4 | 80.6 | 17.1 | 31.0 | 25.6 | −4.3 | 9.4 | 7.8 | NM | NM |
| TCLP before (mg/L) | 0.17 | 2.28 | NM | NM | NM | NM | NM | NM | NM | NM |
| TCLP after (mg/L) | 2.34 | 0.27 | 0.00 | 0.63 | 0.00 | 0.06 | 4.32 | 0.00 | NM | NM |
| Limit in | 5.00/ | 0.5/ | 5.00/ |  |  |  |  | 0.10/ | 5.0/ | 1.0/ |
| Quebec/USA | 5.00 | 1.00 | 5.00 |  |  |  |  | 0.20 | 5.0 | 1.0 |

*Since a significant proportion of the APC residues is dissolved in water during the washes, the removal efficiency may not be calculated by simply comparing concentrations but requires that the mass of dissolved APC residues be considered. In this example, 25.6% of the APC residues was dissolved.
NM: not measured
Conc.: concentration

EXAMPLE NO 3

The results presented in Table 3 below were obtained by applying a method similar to that presented in example 1. The method differs in that 6 alkaline washes were performed instead of 5 and that the APC residues used were constituted solely of used lime. The mercury concentration was particularly high in these APC residues.

TABLE 3

TREATMENT OF APC RESIDUES CONTAINING 100% OF USED LIME ACCORDING TO A SPECIFIC EMBODIMENT OF THE PRESENT INVENTION

|  | Pb | Cd | Cr | Cu | Fe | Ni | Zn | Hg | As | Se |
|---|---|---|---|---|---|---|---|---|---|---|
| Conc. before (mg/kg) | 346 | 26 | 13 | 61 | 2830 | 4.6 | 1060 | 73.4 | NM | 4.31 |
| Conc. after (mg/kg) | NM | NM | NM | NM | NM | NM | NM | NM | NM | NM |
| Removal (%)* | NM | NM | NM | NM | NM | NM | NM | NM | NM | NM |
| TCLP before (mg/L) | 0.16 | 0.43 | 0.00 | 0.05 | 0.22 | 0.04 | 2.81 | 0.45 | 0.00 | 0.02 |
| TCLP after (mg/L) | 0.37 | 0.12 | NM | NM | NM | NM | NM | 0.06 | NM | NM |
| Limit in Quebec/USA | 5.00/ 5.00 | 0.5/ 1.00 | 5.00/ 5.00 |  |  |  |  | 0.10/ 0.20 | 5.0/ 5.0 | 1.0/ 1.0 |

*Since a significant proportion of the APC residues is dissolved in water during the washes, the removal efficiency may not be calculated by simply comparing concentrations but requires that the mass of dissolved APC residues be considered. In this example, 55.7% of the APC residues was dissolved.
NM: not measured
Conc.: concentration

EXAMPLE NO 4

Table 4 below presents the results of applying a specific method according to the present invention to APC residues constituted solely of used lime. This specific method is generally similar to that described in Example 3. It differs in that the APC residues were treated with 3 acidic washing step instead of seven and in that the first acidic wash had a reaction time of 18 hours instead of 30 minutes and finally that no oxidizer was used. This specific method requires that the reactor be larger but this increase in costs can be counterbalanced by the costs saved on chemicals. These APC residues contained mercury amounts over the accepted level before treatment. The method according to the present invention was able to bring it to acceptable levels.

TABLE 4

TREATMENT OF APC RESIDUES CONTAINING 100% OF USED LIME ACCORDING TO A SPECIFIC EMBODIMENT OF THE PRESENT INVENTION COMPRISING A REACTION TIME OF 18 HOURS FOR THE FIRST ACIDIC WASH

|  | Pb | Cd | Cr | Cu | Fe | Ni | Zn | Hg | As | Se |
|---|---|---|---|---|---|---|---|---|---|---|
| Conc. before (mg/kg) | 346 | 26 | 13 | 61 | 2830 | 4.6 | 1060 | 73.4 | NM | 4.31 |
| Conc. after (mg/kg) | 248 | 3.01 | NM | 39.8 | 2709 | 1.1 | NM | 94.5 | NM | NM |
| Removal (%)* | 68.3 | 94.8 | NM | 68.7 | 67.2 | 89.3 | NM | 43.0 | NM | NM |
| TCLP before (mg/L) | 0.16 | 0.43 | 0.00 | 0.05 | 0.22 | 0.04 | 2.81 | 0.45 | 0.00 | 0.02 |
| TCLP after (mg/L) | 3.15 | 0.02 | 0 | 0 | 0.55 | 0 | 1.61 | 0.01 | 0.04 | 0.05 |
| Limit in Quebec/USA | 5.00/ 5.00 | 0.5/ 1.00 | 5.00/ 5.00 |  |  |  |  | 0.10/ 0.20 | 5.0/ 5.0 | 1.0/ 1.0 |

*Since a significant proportion of the APC residues is dissolved in water during the washes, the removal efficiency may not be calculated by simply comparing concentrations but requires that the mass of dissolved APC residues be considered. In this example, 55.7% of the APC residues was dissolved.
NM: not measured
Conc.: concentration

EXAMPLE NO 5

Table 5 presents results of applying a specific method according to the present invention comprising only alkaline washes in the conditions described in example 1 (5 washes). The APC treated contained 26.4% of boiler ashes, 39.5% of electrostatic precipitator ashes and 34.1 used lime.

TABLE 5

TREATMENT OF APC RESIDUES CONTAINING 26.4% OF BOILER ASHES, 39.5% OF ELECTROSTATIC PRECIPITATOR ASHES AND 34.1 USED LIME ACCORDING TO A SPECIFIC EMBODIMENT OF THE PRESENT INVENTION

|  | Pb | Cd | Cr | Cu | Fe | Ni | Zn | Hg | As | Se |
|---|---|---|---|---|---|---|---|---|---|---|
| Conc. before (mg/kg) | 3473 | 269 | 450 | 987 | 17800 | 64.0 | 13500 | NM | NM | NM |
| Conc. after (mg/kg) | 2682 | 347 | 669 | 929 | 23000 | 80 | 19100 | NM | NM | NM |
| Removal (%)* | 46.1 | 10 | −3.8 | 34.3 | 9.8 | 12.7 | 1.2 | NM | NM | NM |
| TCLP before (mg/L) | 7.79 | 0.00 | 0.00 | 0.00 | 0.00 | 0.17 | 1.20 | NM | 0.00 | 0.02 |
| TCLP after (mg/L) | 0.02 | 0.02 | 0.02 | 0 | 0 | 0.02 | 0.27 | 0 | 0.04 | 0.01 |
| Limit in Quebec/USA | 5.00/ 5.00 | 0.5/ 1.00 | 5.00/ 5.00 |  |  |  |  | 0.10/ 0.20 | 5.0/ 5.0 | 1.0/ 1.0 |

*Since a significant proportion of the APC residues is dissolved in water during the washes, the removal efficiency may not be calculated by simply comparing concentrations but requires that the mass of dissolved APC residues be considered. In this example, 30.2% of the APC residues was dissolved.
NM: not measured
Conc.: concentration Although the present invention has been described hereinabove by way of preferred embodiments thereof, it can be modified, without departing from the spirit and nature of the subject invention as defined in the appended claims.

What is claimed is:

1. A method for the treatment of air pollution control (APC) residues comprising:
    a) alkaline washing the residues at least one time, said washing including mixing a liquid with the residues to produce a solution, said solution being maintained at a pH not lower than 11.5, to generate alkaline washed residues;
    b) separating the alkaline washed residues from the liquid portion of the solution produced in a) to generate separated alkaline washed residues;
    c) acid washing the separated alkaline washed residues at least one time, said washing including mixing a liquid with the separated alkaline washed residues to produce a solution, said solution being maintained at a pH between 2 and 4.5, to generate acid washed residues;
    d) separating the acid washed residues from the liquid portion of the solution produced in c) to obtain residues that are substantially devoid of metal components.

2. A method as recited in claim 1 wherein the APC residues are derived from municipal solid waste incinerators.

3. A method as recited in claim 2 wherein each alkaline washing lasts about 30 seconds to about 30 minutes.

4. A method as recited in claim 3 wherein each alkaline washing lasts about 2 minutes.

5. A method as recited in claim 3 wherein the acid washing is performed between 3 to 7 times.

6. A method as recited in claim 5 wherein an oxidizer is added to the solution of c) during the second and the third acid washing.

7. A method as recited in claim 5 wherein a flocculating agent is added to the solutions of a) and c) at the end of each washing.

8. A method as recited in claim 5 wherein the alkaline and acid washings are performed at a temperature of between about 10° C. and about 50° C.

9. A method as recited in claim 8 wherein about 30 to 400 g residues/L are treated in each alkaline and acid washing.

10. A method as recited in claim 5 wherein each acid washing lasts at least about 30 minutes.

11. A method as recited in 1 wherein the APC residues are produced by a source selected from the group consisting of municipal solid waste incinerator, hazardous waste incinerator, medical garbage incinerator, sewage sludges incinerator, coal burning incinerator and metallurgical plant.

12. A method as recited in claim 2 further comprising a step of recuperating the metals from the solutions produced in a) and c).

13. A method as recited in claim 12 wherein the technique for recuperating the metals is selected from the group consisting of precipitation, adsorption, electrowinning, electroplating and cementation.

14. A method as recited in claim 2 further comprising a step of dewatering the residues substantially devoid of metal components.

15. A method as recited in claim 14 wherein the dewatering is conducted with a device selected from the group consisting of plate filter press, belt filter press, vacuum filter, centrifuge and thickener.

16. A method for the treatment of air pollution control (APC) residues comprising the steps of:
    a) alkaline washing the residues at least 1 to 6 times, said washing including mixing a liquid with the residues to produce a solution, said solution being maintained at a pH of not lower than 11.5, to generate alkaline washed residues, each washing lasting about 30 seconds to 30 minutes;
    b) separating the alkaline washed residues from the liquid portion of the solution produced in a) to generate separated alkaline washed residues;
    c) acid washing the separated alkaline washed residues at least one time, said washing including mixing a liquid with the separated alkaline washed residues to produce a solution, said solution being maintained at a pH between 2 and 4.5, to generate acid washed residues;
    d) separating the acid washed residues from the liquid portion of the solution produced in c) to obtain residues that are substantially devoid of metal components.

17. A method as recited in claim 16 wherein the APC residues are MSWI derived.

18. A method as recited in claim 17 wherein each alkaline washing lasts about 2 minutes.

19. A method as recited in claim 17 wherein an oxidizer is added to the solution of c) during the second and the third acid washings.

20. A method as recited in claim 17 wherein a flocculating agent is added to the solutions of a) and c) at the end of each washing.

21. A method as recited in claim 17 wherein the alkaline and acid washings are performed at a temperature of between about 10° C. and about 50° C.

22. A method as recited in claim 17 wherein about 30 to 400 g residues/L are treated in each alkaline and acid washing.

23. A method as recited in claim 22 wherein each acid washing lasts at least about 30 minutes.

24. A method as recited in claim 16 wherein the APC residues are produced by a source selected from the group consisting of municipal solid waste incinerator (MSWI), hazardous waste incinerator, medical waste incinerator, sewage sludges incinerator, coal burning incinerator and metallurgical plant.

25. A method for the treatment of air pollution control (APC) residues comprising:
   a) washing the residues at least one time in an alkaline solution, including a liquid portion and the residues, maintained at a pH of not lower than about 11.5 for a period of between about 30 seconds to about 30 minutes for each wash to produce alkaline washed residues;
   b) separating the alkaline washed residues from the liquid portion of the alkaline solution produced in a) to produce separated alkaline washed residues and an alkaline liquid;
   c) washing the separated alkaline washed residues from b) at least 3 times in an acid solution, including a liquid portion and the residues, maintained at a pH between about 2 and about 4.5 to produce acid washed residues;
   d) separating the acid washed residues from the liquid portion of the acid solution produced in c) so as to obtain residues that are substantially devoid of metal components and an acid liquid;
   e) recovering the residues substantially devoid of metal components;
wherein metals in the alkaline and the acid liquids of b) and d) are recoverable.

26. A method as recited in claim 25 wherein the APC residues are MSWI derived.

27. A method as recited in claim 26 wherein between about 1 to 6 alkaline washings and between about 3 to 7 acid washings are performed.

28. A method as recited in claim 27 wherein each alkaline washing lasts about 2 minutes.

29. A method as recited in claim 27 wherein an oxidizer is added during the second and third acid washings.

30. A method as recited in claim 29 wherein a flocculating agent is added to the solutions of a) and c) at the end of each washing.

31. A method as recited in claim 29 wherein the alkaline and acid washings are performed at a temperature of between about 10° C. and about 50° C.

32. A method as recited in claim 31 wherein about 30 to 400 g residues/L are treated in each alkaline and acid washing.

33. A method as recited in claim 31 wherein each acid washing lasts at least about 30 minutes.

34. A method as recited in claim 31 further comprising a step of dewatering the residues substantially devoid of metal components.

35. The method as recited in claim 1 wherein the alkaline washing the residues is performed at least one to six times.

* * * * *